United States Patent Office 3,109,201
Patented Nov. 5, 1963

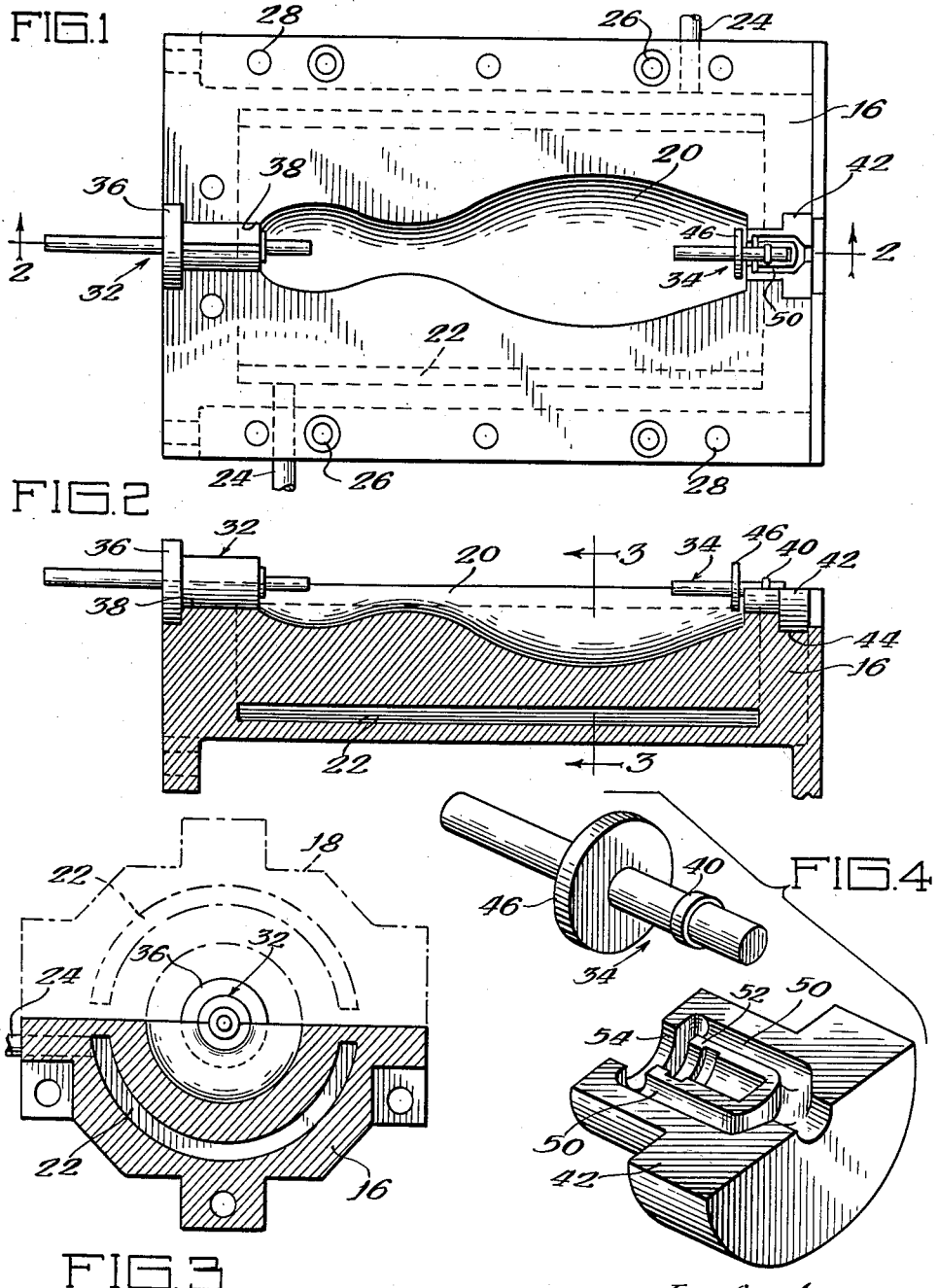

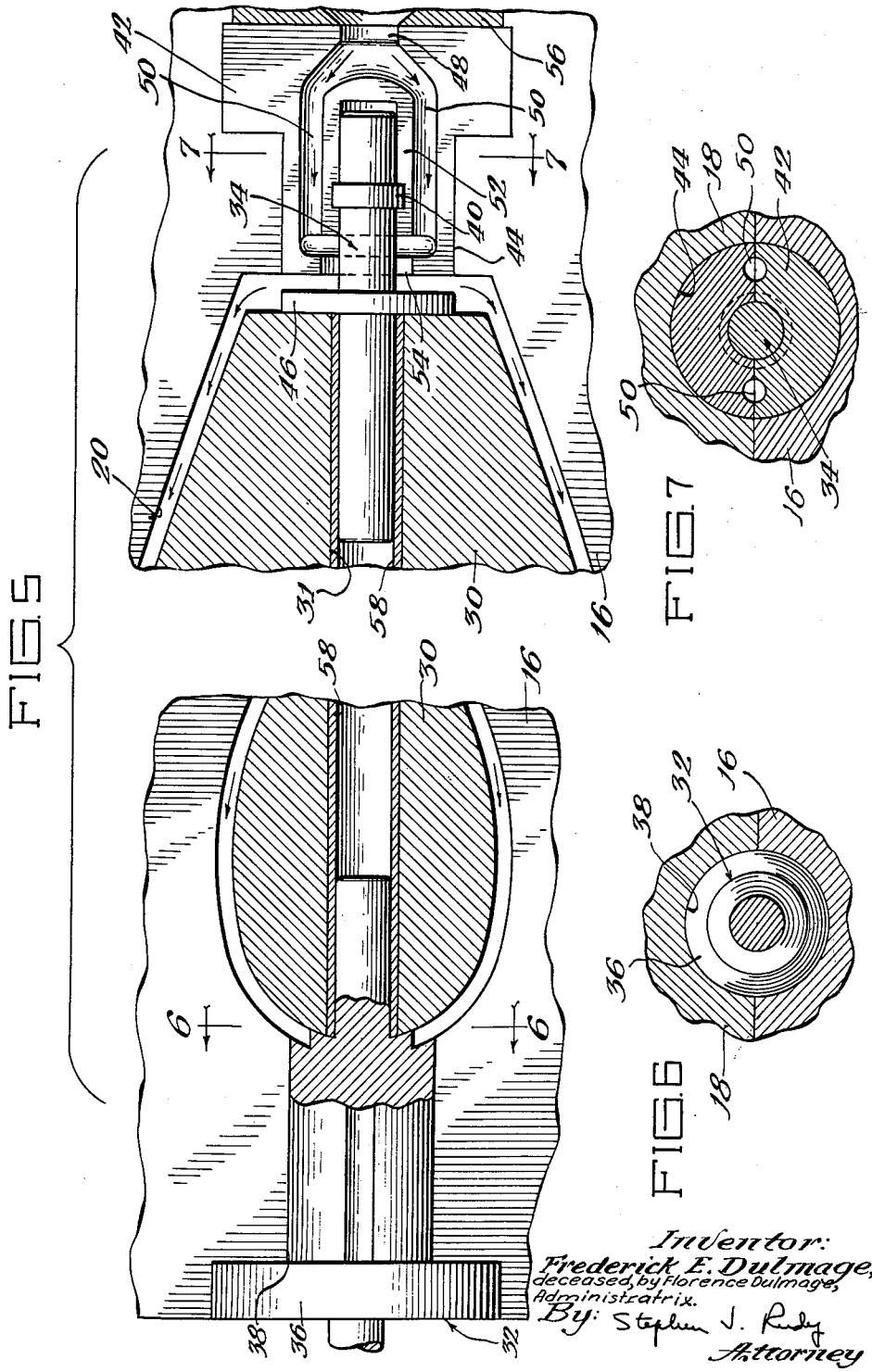

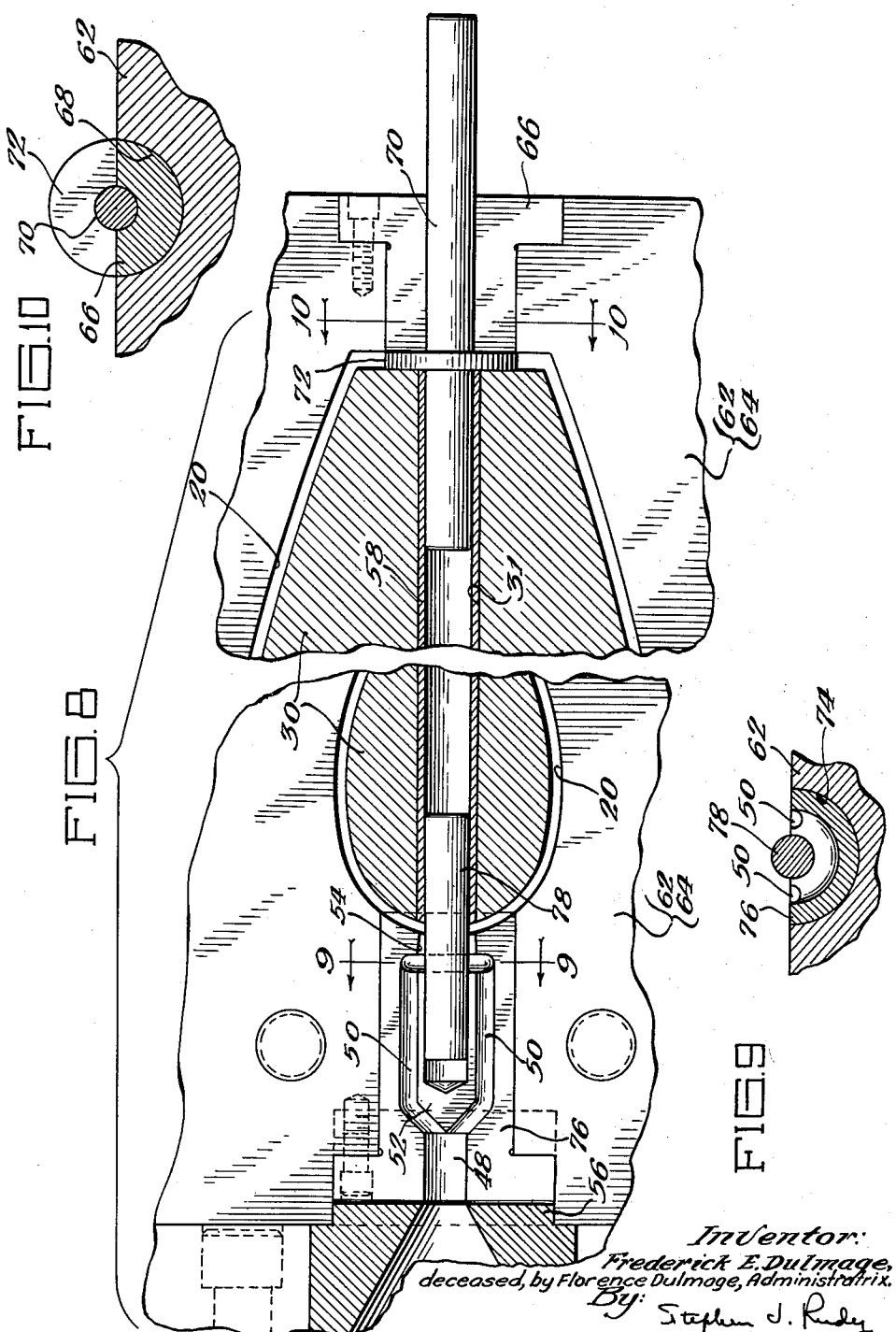

3,109,201
APPARATUS FOR MANUFACTURE OF
BOWLING PIN
Fred E. Dulmage, also known as Frederick E. Dulmage, deceased, late of Saginaw, Mich., by Florence Dulmage, special administratrix, Saginaw, Mich., assignor to The Dow Chemical Company, Midland, Mich., a corporation of Delaware
Original application Apr. 4, 1960, Ser. No. 19,772. Divided and this application Feb. 13, 1961, Ser. No. 94,108
3 Claims. (Cl. 18—36)

This invention relates to an improvement in apparatus for plastic cladding bowling pins.

This application is a divisional application of my original copending application, Serial No. 19,772, filed April 4, 1960, which contains claims relating to a bowling pin as disclosed herein.

In the bowling pin manufacturing art it is known to fabricate a composite bowling pin by applying a protective rubber, or plastic covering to the pin, which covering may be partial, or total, in either case the main object being to achieve longer life of the pin under severe conditions of use, while still retaining the desirable characteristics of the all wood type bowling pin. In general, such methods of bowling pin fabrication have not produced satisfactory composite bowling pins because of various reasons, for example: pin warpage caused by high and/or uneven pressures during molding; failure of cover bonding due to impact stress, and shrinkage or expansion, of the covering and/or the wooden core; irregular pin tumble patterns when struck; and high cost of manufacture, to mention but a few.

The apparatus of the present invention may be used to produce composite bowling pins which not only avoid many of the shortcomings of composite bowling pins of the prior art, but which have relatively long life under severe conditions of use, while still retaining the desirable characteristics of the all wood type bowling pin.

Briefly, the method of the invention relates to the injection of a plastic material into a die, in which a low density wooden core is supported, such injecting being done under slow flow rate and relatively low pressures. The use of slow flow rates and low pressures allows the plastic to be at relatively low temperature—slightly above molten temperature—thus allowing heavy coating sections to be molded without undesirable shrinkage or weld lines. The use of a low density wood core permits greater coating thickness for added strength, while maintaining correct balance and an overall weight distribution corresponding to that of a solid wood pin. In addition, the slow flow rate of injection provides excellent bonding, or adhesion of the plastic to the wood core without the need for special primers or adhesives. Means are provided to avoid damage to the core during molding, which means primarily deflect the coating material away from the core as the material enters the die. The plastic coating is free from weld lines, normally associated with non-uniform flow or high molding pressures, and requires little if any finishing operations after molding. To provide added strength to the pin, especially to avoid breakage in the neck section, a metal tube is arranged in the center of the pin, substantially along the entire length thereof. The arrangement and length of the reinforcing tube does not appreciably alter the center of gravity and center of percussion of the pin, so that the bowling pin of the invention has a tumble pattern upon impact substantially like that associated with the all wood type of bowling pin.

A primary object of this invention is to provide an improvement in apparatus for plastic cladding bowling pins.

A more specific object is to provide apparatus for plastic cladding bowling pins, which apparatus will prevent damage to the wooden core of the bowling pin during a cladding operation.

These and other objects and features of the invention will become more apparent from the following description and accompanying drawings, wherein:

FIG. 1 is a plan view of one half of a die assembly used in fabricating a bowling pin according to the method of the invention;

FIG. 2 is a section view generally as seen along line 2—2 in FIG. 1;

FIG. 3 is a section view generally as seen along line 3—3 in FIG. 2;

FIG. 4 is an exploded perspective view of certain elements used in the die assembly of FIG. 1;

FIG. 5 is a fractured section view illustrating the flow pattern of the coating material during a cladding operation, and showing the die mold being filled from the bottom end of the pin;

FIG. 6 is a section view generally as seen along line 6—6 in FIG. 5;

FIG. 7 is a section view generally as seen along line 7—7 in FIG. 5;

FIG. 8 is a section view similar to FIG. 5, but showing the die mold when being filled from the top end of the pin;

FIG. 9 is a section view generally as seen along line 9—9 in FIG. 8; and

FIG. 10 is a section view generally as seen along line 10—10 in FIG. 8.

Referring now to the drawings and more particularly to FIGS. 1 to 3, the numeral 16 identifies a die which forms one-half of a mold, the other die 18 being similar in size and structure to die 16. The die 16 contains a mold recess or cavity 20 conforming to one-half of a bowling pin; when the two dies are secured together with the mold cavities 20 facing each other, the resulting mold cavity will, of course, be such as to provide the shape and size of the bowling pin to be produced therein. The dies 16, 18 each have a semi-circular recess 22 formed therein, each of which is served by pipe, or conduit means 24 for sequentially circulating a heating medium (hot water or steam), and a cooling medium, through the dies, as required during molding operations. Bleed off holes (not shown) are arranged in the dies to indicate when the mold is filled with the plastic coating material, so that injection operation may be terminated at the proper time. Said bleed off holes also prevent excessive pressure build-up in the mold during molding operation. Holes 26 are arranged for receipt of locating dowels (not shown) which may be used for proper alignment of the dies 16, 18 during mold assembly, while additional holes 28 are provided for stud, or bolt means (not shown) adapted to hold the dies securely together, all as in accordance with general molding practice.

As stated earlier herein, the bowling pin of the invention is of a composite type, i.e., having a wooden core which is encased in a plastic covering. FIG. 5 illustrates the arrangement of such a bowling pin wooden core 30 as positioned in the mold for the plastic covering operation. To secure the core 30 within the mold, pin means are used at each end of the mold which are arranged to enter a center hole, or passageway 31, formed in the core. Said pin means comprise at one end, a pin 32, and at the opposite end, a pin 34. Pin 32, which is cylindrical in form and has a collar 36, is arranged to seat in recesses 38, formed in the dies 16, 18, while pin 34, which is cylindrical in form and has a collar 40, is arranged to seat in sprue bushings 42, adapted to fit in recesses 44 formed in the dies. Pin 34 has a deflecting means in the form of an integral disc portion 46, which deflects incoming plastic material away from immediate contact with the wooden core 30. Closure of the mold, i.e., placing dies 16 and 18 in molding position, results in snug clamping of the pins 32, 34 in position, so that the wooden core is maintained against movement in any direction.

The sprue bushings 42 are provided with an opening 48 at one end which leads into a bifurcated passageway 50, passing around a center pin holding island 52, said passageway 50 leading to an opening 54, through which the pin 34 projects. It will be seen that plastic material coming from an injecting head 56, will enter the opening 48, flow into passageway 50, around the island 52, and into the mold recess 20. Since the pin core 30 is maintained a spaced distance from the surface of the recess 20, the plastic material will flow in the volume provided between the core 30 and recess 20, to completely encase the wooden core.

A metal tube, or sleeve 58 is arranged in the center hole 31 of the core 30, which tube extends substantially the full length of the core, and which provides reinforcement to the finished bowling pin, to better resist breakage thereof, especially in the neck, or narrow section of the pin.

With the mold assembled, as above described, including positioning therein of a wood core 30, which preferably is made of a low density wood, such as poplar or aspen, the mold is ready for the plastic cladding, or covering operation. While many types of thermo-plastic materials may be used, a high impact resistant plastic, such as ethylcellulose, will be found to be quite satisfactory. Other thermo-plastics such as cellulose acetate butyrate, cellulose acetate, nylon, and high impact polystyrene, may also be used. In an actual production run, a plastic material consisting of 80% "Ethocel LT-5" (trade-designation for a plastic made by The Dow Chemical Company), 10% N-butyl stearate, and 10% dibutyl sebacate, was found to produce good quality bowling pins which satisfied the stated objectives of the invention. In the molding operation employed, according to the invention, the mold was heated with oil (380° F. to 430° F.), and the plastic material at 380° F. was injected therein until the mold was filled. Pressure within the mold during plastic injecting ranged from 800 p.s.i. to 1,200 p.s.i. The oil was then circulated through a refrigerating system until the mold contents approached room temperature. The complete molding cycle varied between 45 to 60 minutes, which was broken down as follows: 5 minutes for mold setup, 7 minutes for purging and filling, and 35 to 45 minutes for cooling and removing the molded pin from the mold. After removing the bowling pin from the mold, the only additional steps necessary were removing the pins 32 and 34 (the latter requiring a simple machining operation to cut away the plastic material surrounding the outer surface of the disc portion 46), providing a cap 60 at the top end of the pin to plug the tube 58, and a cap 61 at the lower end of the pin if desired, and subjecting the pin to a slight polishing operation if necessary to remove any mold lines.

It will be found that the apparatus for application of the method of the invention causes uniform plastic flow on all sides of the core, while the pin disc portion 46 directs the force of the entering plastic to the die recess, thus protecting the core against compression and/or warpage. The use of slow filling speed, and a heated die cavity, minimize drag on the core, and assures uniform filling, to produce a pin covering free from weld lines, or areas of concentration and stress. Furthermore, the method of the invention provides a coating thickness of from ⅛" to ⅜" thus giving high strength and durability to the pin, while maintaining correct balance and overall weight corresponding to that of a solid maple pin. The molding process of the invention, utilizing low mold pressures, does not result in excessive compression or deformation of the wood core, as often occurs in other methods of forming a composite, or plastic coated pin.

In FIGS. 8–10 is illustrated an arrangement for practicing the method of the invention as used for molding a bowling pin from the top end thereof, and in which parts identical with those hereinbefore described, will be identified by the same numerals. The dies 62, 64 are substantially like dies 16, 18 respectively, the main difference being in the pin holding ends of the dies. At the end of the die adjacent to the lower end of the pin, a split bushing 66 is arranged to fit into a recess 68 formed in the die, which bushing supports a pin 70 that is similar to pin 34 in having a disc portion 72 formed integral therewith. The pin 70 supports the lower end of the core 30 during the molding, or plastic cladding operation. At the opposite end of the die 62 is a recess 74 for holding a split sprue bushing 76, which is similar to sprue bushing 42, and has an opening 48, bifurcated passages 50, and a pin holding island 52. A pin 78 is supported in the bushing 76, which pin 78 extends into the bowling pin tube 58, and together with pin 70, fixes the core against movement in the mold, formed when the dies 62 and 64 are secured together in readiness for the mold injecting operation. The slow rate of molding, together with the low pressure used, produces a composite pin which is free from weld lines, or areas of concentration and stress.

The method of the invention may be used for the production of other items such as sporting goods, i.e., bats, or bat handles, juggling pins, etc., or household goods, i.e., lamp bases, and many other items wherein cores are coated with a plastic to provide strength and a pleasing appearance.

The foregoing description has been given in detail without thought of limitation since the inventive principles involved are capable of assuming other forms without departing from the spirit of the invention or the scope of the following claims.

What is claimed is:

1. In a mold for encasing a wooden core in a plastic material, a sprue bushing arrangement for deflecting the incoming plastic material away from immediate contact with the core, said bushing arrangement including a bushing means formed to provide entry and exit of plastic material therethrough, said bushing means being further formed to provide a pin support, and a pin means adapted to be positionally supported by said bushing means, said pin means including a plastic deflecting means in the form of an integral disc portion, said pin means being arranged so that the deflecting means is maintained a short distance from the exit of the bushing means when the pin means is supported by said pin means support.

2. In a mold for encasing a wooden core in a plastic material, a sprue bushing arrangement for deflecting the incoming plastic material away from immediate contact with the core, said bushing arrangement including a split bushing formed with openings at each end and a bifurcated passageway means joining said openings, said bushing being further formed to provide a pin means support, and a pin adapted to be held by the bushing pin means support and having an integral disc portion, said pin being arranged so that the disc portion is maintained a short distance from one of said openings when the pin is being held by the bushing pin means support.

3. In a mold for encasing a wooden core in a plastic material, a sprue bushing arrangement for deflecting the incoming plastic material away from immediate contact with the core, said bushing arrangement comprising a split bushing having symmetrically arranged halves, each of said halves having a center pin holding island formed to provide passageways extending longitudinally about said island, said halves each being formed with an opening at each end which connect with the passageways, and a pin having an integral disc portion, said pin being arranged so that the disc portion is maintained a short distance from an exterior of the bushing when one end of the pin is supported in the pin holding island.

References Cited in the file of this patent

UNITED STATES PATENTS

| | | |
|---|---|---|
| 2,763,032 | Fay | Sept. 18, 1956 |
| 2,983,958 | Fay | May 16, 1961 |